Sept. 27, 1927.  M. B. RODERICK  1,643,679

FLUE SHEET TOOL

Filed April 6, 1926

INVENTOR
Marcy B. Roderick
BY
ATTORNEY

Patented Sept. 27, 1927.

1,643,679

UNITED STATES PATENT OFFICE.

MARCY B. RODERICK, OF RUTHERFORD, NEW JERSEY, ASSIGNOR TO W. L. BRUBAKER & BROS. COMPANY, OF MILLERSBURG, PENNSYLVANIA, A CORPORATION.

FLUE-SHEET TOOL.

Application filed April 6, 1926. Serial No. 100,133.

This invention relates to a flue sheet tool for use in drilling, reaming and countersinking flue holes in the flue sheets of boilers and other similar flue sheets, the main object of the invention being to provide a tool by which all three of these operations of drilling, reaming and countersinking flue holes may be performed by means of one and the same tool and continuously carried out, thus enabling such work to be done at a material saving of time, labor and expense.

A further object of the invention is to provide a construction whereby clearance of the chips is facilitated and rapid clearance ensured in order to prevent choking of the cutters.

A still further object of the invention is to provide a tool of the character described which is simple and comparatively inexpensive of construction, and in which the working tool elements are readily removable from the body or shank for resharpening, repairs or the substitution of new tool elements for worn out ones.

The invention consists of the features of construction, combination and arrangement of parts, hereinafter fully described and claimed, reference being had to the accompanying drawing, in which:—

Figure 1:
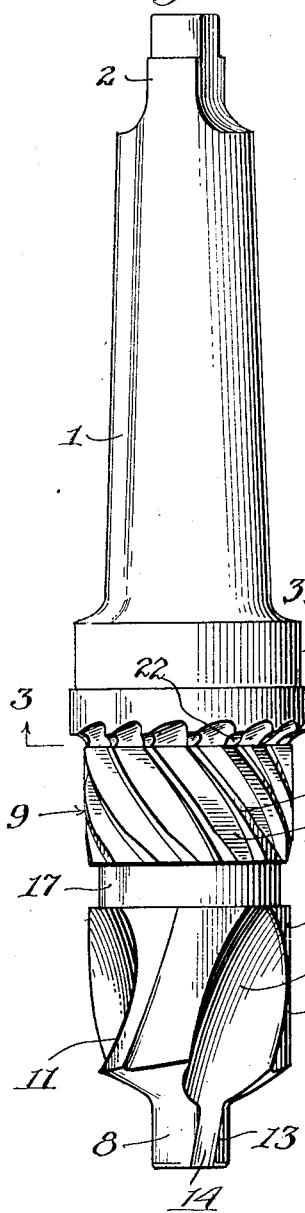
Figure 1 is a side elevation of a flue sheet tool embodying my invention.
Figure 2:
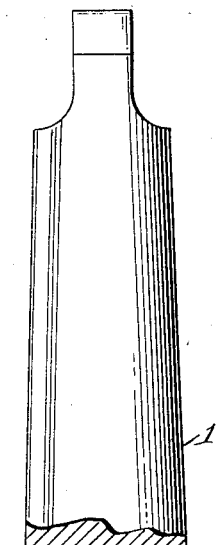
Figure 2 is a sectional elevation of the same, the section being taken axially through the working portion of the tool.
Figure 4:
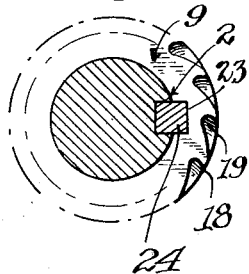
Figure 3:
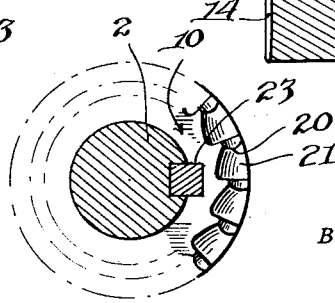

Figures 3 and 4 are cross-sections taken respectively on lines 3—3 and 4—4 of Figures 1 and 2.

Figure 5:
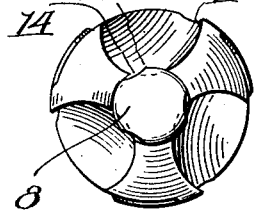

Figure 5 is a front end elevation of the tool.

In carrying my invention into practice I provide a flue sheet tool comprising a body or stock having a shank portion 1 terminating at its rear end in an angular tang 2 for connection with a suitable type of driver whereby the tool may be rotated. At its forward end the shank portion 1 is provided with a reduced stem portion 2', between which and the said shank portion is formed a fixed collar or flange 3 providing an abutment shoulder 4, the stem portion 2' being provided with a forward threaded surface 5 and a longitudinal slot or keyway 6, as shown.

Mounted upon the stem portion 2' are working tool members, comprising a drill 7 provided with a pilot cutter 8, a reamer 9 and a fillet cutter or countersink 10. The drill tool 6 consists of a body provided in rear of the pilot portion 8 with spirally arranged cutting blades or edges 11 and clearance flutes 12. The pilot portion 8 is reduced with respect to the body portion of the drill so as to enter a previously drilled small hole in the flue sheet and is provided with angularly arranged cutters 13 and grooves or flutes 14. which grooves or flutes 14 communicate with the forward ends of the flutes 12. At its rear end the drill 7 is provided with an internally threaded socket 15 to engage the threaded portion 5 of the stem 2', said socket being formed in part by a rearwardly extending flange 16 of less diameter than the body of the drill to provide an annular clearance space or channel 17 between the rear end of the cutting portion of the drill and the forward end of the reamer 9.

The reamer 9 and fillet cutter or countersinking tool 10 consist of ring shaped bodies or annuli formed to fit upon the stem 2' in rear of the drill 7 and between the same and the shoulder 4 of the shank. The reamer 9 is provided with spirally disposed cutting blades or edges 18 and clearance grooves or flutes 19 opening at their front and rear edges through the front and rear edges of the body of the reamer. The grooves or flutes 19 communicate with the clearance space or channel 17 at the rear of the drill, but the forward portion of the reamer is of somewhat larger diameter than the base wall of the channel 17 and forms a rear wall therefor as well as a deflecting surface, whereby the drill cuttings or chips traveling along the flutes 12 are deflected laterally and caused to discharge through the clearance space or channel whereby they are prevented from entering the reamer flutes 19.

The filleting cutter or countersinking tool 10 is of somewhat larger diameter than the reamer 9 and has a tapered or conical forward face provided with cutting edges 20 and clearance grooves or flutes 21, the edges 20 being further provided with transverse notches 22 forming auxiliary grooves or clearance spaces between adjacent flutes 21. These notches 22 are arranged to coincide with the rear ends of the cutter carrying ribs or walls between the flutes 19 of the reamer 9, while the main flutes 21 of the countersinking tool are disposed in alinement with the rear ends of the flutes 19, so as to form final clearance passages for the cuttings or chips removed by the cutters of both the reamer and the countersinking tool. The transverse notches or auxiliary flutes 22 provide a means for the passage of the cuttings between adjacent flutes 19 so as to facilitate their discharge and to act as relief passages to avoid clogging of the chips or cuttings in any of the flutes 19 or 21 in the operation of the tool. The reamer 9 and countersinking tool 10 are adapted, upon the removal of the drill 7, to be applied to or removed from the stem 2' separately or unitarily. When in working position they are clamped against each other and against the abutment surface 4 of the shank by the drill 7, which acts as an adjustable clamping member to hold them in position against forward displacement. In said tools 9 and 10 are formed keyways 23 to receive a key 24 engaging the keyway or groove 6 in the stem 2', whereby said tools 9 and 10 are conjointly locked against rotation and yet coupled in such manner as to enable them to be disconnected for removal from the stem portion. With this construction, it will be understood that in assembling the tool parts, the key 23 is first fitted in the keyway 24, after which the countersinking tool 10 and reaming tool 9 are successively fitted in position by slipping them longitudinally over the stem portion 2' and engaging them with the key, after which the drill member 7 is applied to the threaded part of the stem portion and turned up tight against the reamer, thus clamping the reamer and countersinking tool against the shoulder 4.

In the use of the device, it will be understood that the pilot cutter 8 is inserted into the preliminarily formed hole of reduced diameter drilled in the flue sheet and the tool rotated, the pilot 8 forcing its way and bringing the drill 7 into play, the cutters of which enlarge the hole to the intended diameter. Upon the conclusion of this operation a continued forward movement of the tool will bring the reamer 9 into action, the cutters of which will ream the wall of the hole to a desired degree of smoothness. Upon this operation being completed and the rotation of the tool continued the cutters of the filleting tool or countersink 10 will cut off the wire edge left remaining, thus giving a necessary finish to the wall of the hole so that the flue may be fitted at once in position without the necessity of performing any further work. Inasmuch as these operations are continuous, it will be understood that such operations may be easily, conveniently and quickly performed. As the blades of the drill 7 cut, the chips or cuttings travel rearwardly in the flutes 12 and discharge through the clearance passage 17, any chips or cuttings tending to hang being deflected by a front surface of the reamer 9 and caused to discharge without passing into the flutes of the reamer. The cuttings made by the reamer pass rearwardly through the flutes 19 and enter the flutes 21 of the countersinking tool 10, whereby they are outwardly deflected and discharged. The described construction and arrangement of the reamer and countersink ensures rapidity of action of the reaming and countersinking operations and a rapid clearance of the chips without tendency to clog in the flutes thereof. The cross grooves or flutes 22 serve, as stated, to divide up the discharging chips between adjacent flutes so as to avoid any clogging tendencies in the event that chips of any undue length should be formed.

By reason of the described construction of the tool, a convenient type of tool for the purpose set forth is not only provided, but one and the same stock may be continuously used with new working tools as those in use become dull or worn out, and the mode of mounting the tools permits of their ready and convenient removal and replacement as occasion requires. The use of this tool, whereby a special tool for forming flue holes is provided, enables the three different steps of drilling the hole for enlargement, reaming the hole and filleting it to be performed in a single continuous working operation at a material saving in time, labor and expense as contrasted with prior tools and operations requiring two or three, at least two, separate and independent working steps to do the same work. This is of great importance particularly in boiler manufacture where large numbers of flue holes have to be formed and a saving of time and labor is a factor in increasing output and reducing manufacturing costs. By also providing tools which operate successively in working alinement the danger of forming imperfect holes is avoided or reduced to the minimum, with a consequence of securing more accurate alinement of the flues and less waste of partially or wholly completed material rejected because of imperfect workmanship.

Having thus fully described my invention, I claim:—

1. A tool of the character described comprising a stock having a projecting stem and a shoulder at its point of intersection with the stem, said stem being provided with a key receiving groove, a reamer mounted on said stem, a filleting cutter mounted on the stem between the reamer and shoulder, said reamer and filleting cutter being provided with spiral cutting blades and flutes and with key receiving grooves registering with each other and with the grooves in the stem, a key seated in the groove of the stem, reamer and filleting cutter and holding said reamer and cutter against rotation, and a drilling tool in threaded engagement with the stem and arranged to bear upon the forward end of the reamer for clamping said reamer and filleting cutter against said shoulder.

2. In a tool for forming flue holes in flue sheets, a body or stock having a shoulder and a stem projecting forwardly from the shoulder and provided with a front threaded portion and a rear portion formed with a key seat extending between the inner end of said threaded portion and the shoulder, a key engaging said seat, a front cutter having blades separated by flutes to enlarge a hole previously formed in the sheet, said cutter being formed with a front pilot portion and provided at its rear with a smooth-surfaced collar of reduced diameter with respect to the rear portion of the cutting surface of said cutter and with which the rear ends of the flutes of the cutter connect, and said cutter being also provided at its rear end with a threaded socket bounded by said collar and engaging the threaded portion of the stem, a rear filleting cutter encircling the stem and abutting against said shoulder and having cutting blades separated by flutes and also having a key seat receiving a portion of the key, and an intermediate cutter encircling the stem between the collar of the front cutter and forward edge of the rear filleting cutter, said intermediate cutter being provided with reaming blades separated by flutes communicating at their forward end with the annular channel between the front and intermediate cutters formed by the collar and at their rear ends with the flutes of the rear filleting cutter, said intermediate cutter having a key seat receiving a portion of the key.

In testimony whereof I affix my signature.

MARCY B. RODERICK.